United States Patent [19]

Barcelon

[11] Patent Number: 4,832,132
[45] Date of Patent: May 23, 1989

[54] HAND WEEDER

[76] Inventor: James M. Barcelon, 3 Woodford Dr., Moraga, Calif. 94556

[21] Appl. No.: 156,215

[22] Filed: Feb. 16, 1988

[51] Int. Cl.⁴ .............................. B66T 3/00; A01B 1/16
[52] U.S. Cl. ..................................... 172/371; 294/50.5; 254/132
[58] Field of Search ............................. 254/132, 131.5; 294/50.5, 50.8, 50.9; 172/371, 378

[56] References Cited

U.S. PATENT DOCUMENTS

| | | | |
|---|---|---|---|
| 2,185,552 | 1/1940 | Hecox | 294/50.5 |
| 2,436,500 | 2/1948 | Anderson | 294/50.8 |
| 2,806,733 | 9/1957 | Hund | 294/50.9 |
| 2,901,280 | 8/1959 | Hall | 294/50.8 |
| 3,608,644 | 9/1971 | Ambrose | 254/132 |
| 4,281,866 | 8/1981 | Atcheson | 254/132 |

Primary Examiner—Richard J. Johnson
Attorney, Agent, or Firm—George W. Wasson

[57] ABSTRACT

A manually operated weeder tool is disclosed. The tool has a weed engaging portion with a prong centered on the weed engaging portion. In a preferred form the weed engaging end has a forked tip and a prong extends between the tips of the fork end. The prong is preferrably serrated so as to entangle the root portion of a weed below the surface of the earth. The tool may be provided with a depth control attachment and a leverage bar that will assist in the extraction of a weed.

8 Claims, 2 Drawing Sheets

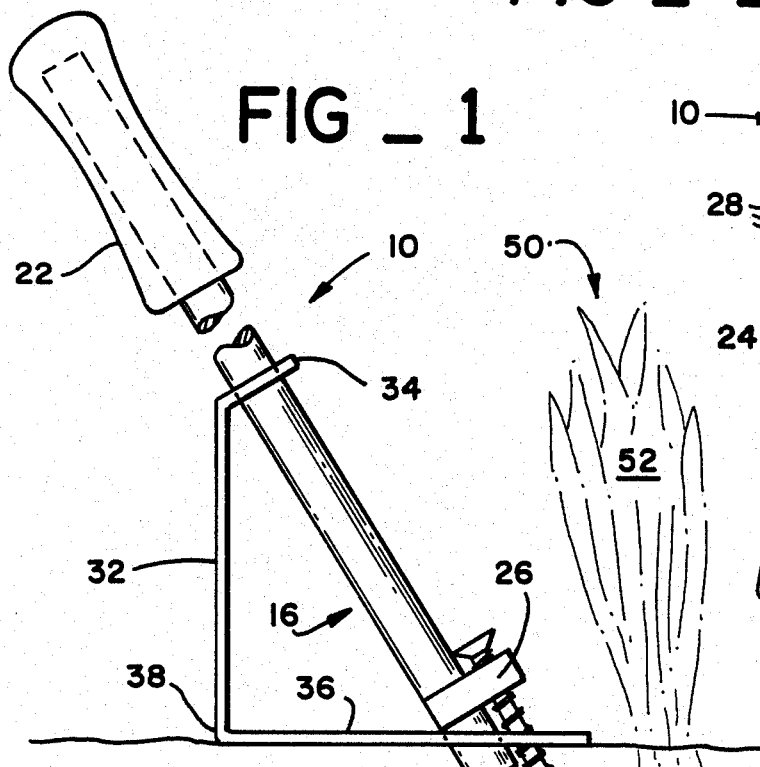
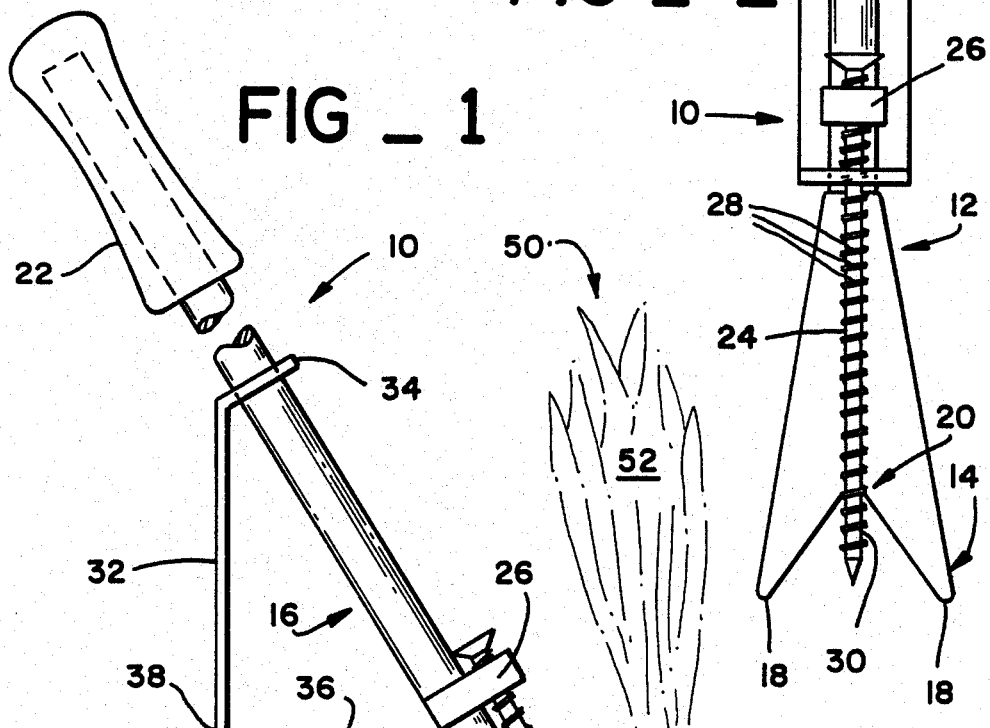
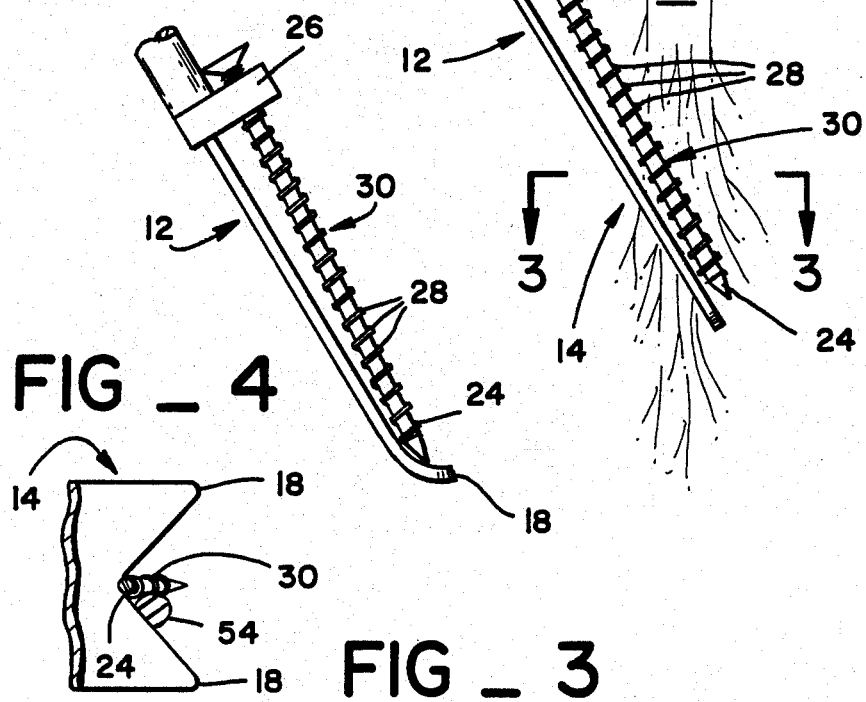
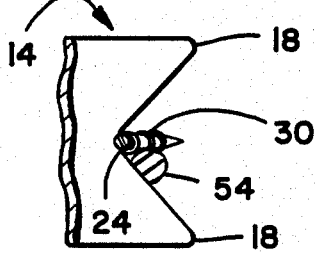

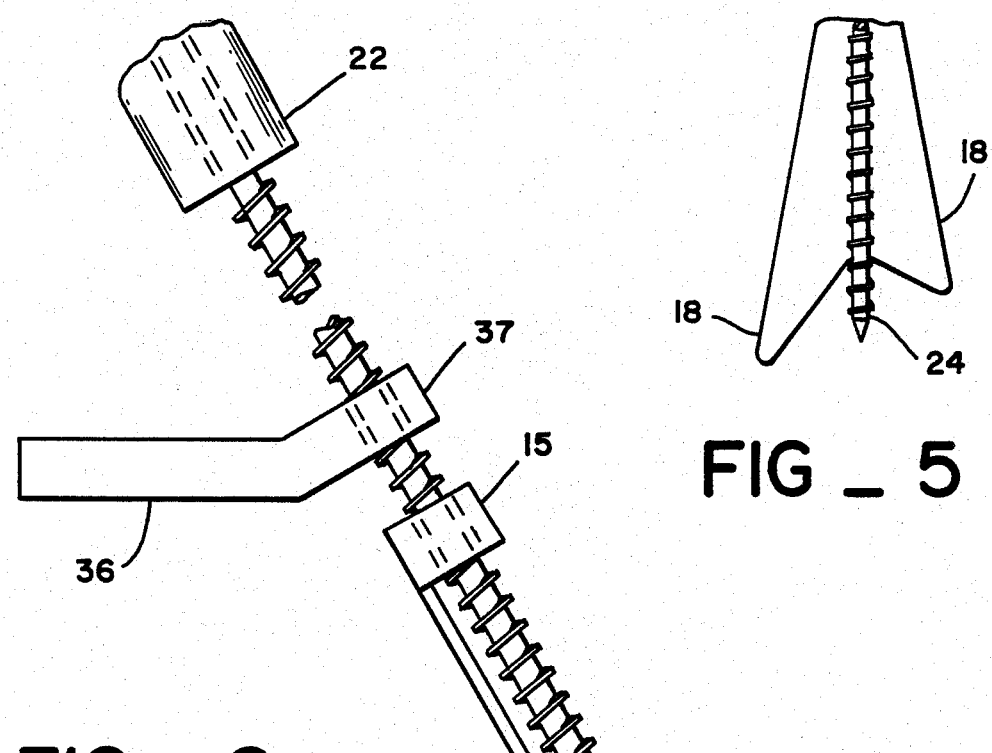
FIG_5
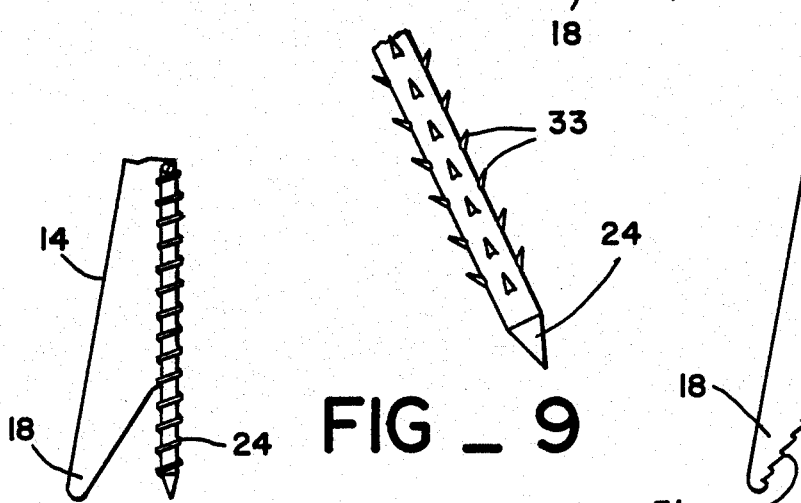
FIG_8
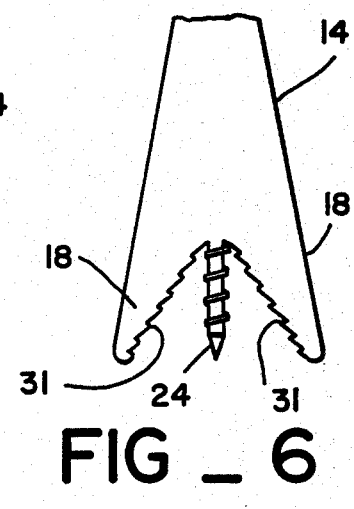
FIG_9
FIG_7
FIG_6

HAND WEEDER

This invention relates to a weeding tool and more particularly to a hand held and hand operated weeding tool adapted with a blade and prong portion that assists in engaging the root of a weed below the soil surface to provide an effective means for extracting the weed from the soil.

BACKGROUND OF THE INVENTION

1. Field Of The Invention

This invention is directed to manual mechanical weeders for extracting weeds or the like from the ground in which the operator may stand, squat or be prone while extracting the weed.

2. Description Of The Prior Art

Extracting weeds or other unwanted vegetative growth from garden or lawn areas has been an undesirable task for most persons. Weeds by definition may be any vegetative growth that is not consistent with the desired appearance of the garden or lawn area, and weeds are characterized by most gardeners as a vegetative growth which requires constant attention if they are to be eradicated. Weeding can be done by merely removing the surface and visible portion of the weed, but most gardeners know that removing the visible portion of a weed without removing the root portion will only temporarily remove the evidence of the weed because the roots will send up new surface growth in a very short time. To be completely effective in weed removal it is desirable to get as much of the root of the weed as possible. To accomplish such a weed removal operation it is necessary to penetrate the ground around the weed and to engage the weed at it subsurface portion. Desirably the weed and its entire root should be removed to accomplish a completely successful weed removal operation.

Hand operated mechanical weeders for lawns, gardens, and the like are known in the art, for example:

(a) there are known tools that have a flat fishtailed or claw-shaped blade for cutting or catching the weed root, and a straight or gently curved, elongated shank with an axially extending handle;

(b) there are tools having an off-set blade with a rounded central portion capable of cutting a divot in the soil;

(c) there are tools that have a zig-zag, double pointed blade with a step portion and a rounded heel portion forming a fulcrum;

(d) and there are sickle type tools that merely remove the surface position of a weed.

Relevant patents known to me are; Kulesh, U.S. Pat. No. 2,373,898, issued Apr. 17, 1945; Sapia, U.S. Pat. No. 3,293,674, issued Dec. 27, 1966; and Long, U.S. Pat. No. 3,847,226, issued Nov. 12, 1974.

This art does not teach or suggest a weeder tool having a blade with a forked tip with a serrated prong extending through the center of the forked tip at its weed engaging end, and an attachment providing depth control and a fulcrum for the weed extracting operation.

Sapia provides a straight two edged sickle which is swung like a golf club, and the weed root pulling aspect of his tool is not considered in accommodating the sickle function of the tool. The Sapia tool does not relate to my invention.

Kulesh discloses a multiple-bend, zig-zag blade with a weed receiving throat in a tool for use as a weeder or a cultivator. With this tool the weed is grasped in the throat of the tool just below the foliage of the weed and the weed is extracted by a fulcrum action lifting the weed being held in the throat.

Long has an offset blade that cuts a divot and pushes the weed and the divot up and out of the ground. This tool requires replacement of the divot. Divot removing tools make the weeding process more difficult in that the weed must be removed from the divot and the divot replaced if the weeded area is to be retuned to an attractive appearance.

SUMMARY OF THE INVENTION

It is, therefore, a general object of my invention to provide a new and improved weeder tool for use in lawns, gardens and the like, primarily useful to easily and seedily remove weeds without undue disturbance of the surrounding soil.

Another object of my invention is to provide a new and improved weeder tool which may be used in a standing or kneeling position as desired and/or dictated by the location of the weed.

A further object of my invention is to provide a weeder tool which positively engages a weed in its root-crown zone where it is thickest and strongest, thereby enabling extraction of the weed from the soil with at least a major portion of the weed's root system.

In summary, my weeder is efficient, effective and speedy in use and operation; may be economically produced and is simple and rugged in construction and design. My invention provides for firm engagement of the weeder head with the root where the root is thick and strong and for leveraged lifting of the weed from the ground. The weeder head is forked and has at least one projecting prong. In a preferred form the prong is serrated along its length and the serrated prong extends through the V-shape formed by the forked blade approximately along the line of the handle. An associated attachment or projection limits penetration of the tool head into the ground and provides a fulcrum for raising the weed when the handle is manually lowered toward the surface of the ground.

Further objects and features of the present invention will be readily apparent to those skilled in the art from the appended drawings and specification illustrating preferred embodiments wherein:

BRIEF DESCRIPTION OF THE DRAWINGS

FIG. 1 is side elevational view of the tool of the present invention showing its use in engaging a weed below the surface of the ground.

FIG. 2 is a front elevational view of one form for the weed engaging portion of the tool of the present invention.

FIG. 3 is a sectional view taken along the lines 3—3 of FIG. 2.

FIG. 4 is a side elevational view of an alternative form of the weed engaging portion of the present invention.

FIG. 5 is an alternative form of the weed engaging portion with one of the tips shorter than the other.

FIG. 6 is an alternative form of the weed engaging portion with the tips serrated.

FIG. 7 is an alternative form of the weed engaging portion with a single tip.

FIG. 8 is an alternative form of the weed engaging portion of the tool.

FIG. 9 is an illustration of the prong portion with an alternative form of serrations.

DETAILED DESCRIPTION OF THE INVENTION

As illustrated in the drawings and particularly in FIG. 1, the weeder 10 of the present invention comprises a member 12 having a weed engaging end 14 and a handle engaging end 16. The member may be formed from a single stock of material with the weed engaging end forged, machined or stamped to the desired shape. The weed engaging end 14 is more clearly seen in FIG. 2 where it may be seen that the free end of the member is bi-forked to establish a pair of tips 18 and a connecting bight 20. The handle end of the member is adapted to be attached to a handle 22 by suitable means as are used in many garden or farming tools.

The weed engaging end 14 of the member 12 has a prong 24 attached thereto in a manner to have the prong fixed to the member 12 along one of its faces with a free end of the prong extending along that face of the member, between the tips 18 at the weed engaging end, and along the line of the handle end 22. The mounting of the prong to the face of the member as shown at 26 is any conventional mounting means that will securely fix the prong 24 to the member 12 with the provision that the prong may be adjustably moved within the mounting to adjust the position of the end of the prong 24 with respect to the face of the member and the tips 18. With the wrong mounted between the pair of tips 18 it effectively produces a bight between each tip and the prong to function in a manner to be described.

In a preferred form, the prong 24 has serrations 28 along its exterior with the purpose of the serrations being more clearly understood when operation of the weeder is described. The serrations may be uniformly or randomly aligned fingers 30 pressed or formed axially along the prong 24, as shown in FIG. 9, or the fingers may be in screw thread form spirally along the prong 24. A preferred form for the fingers 30 with respect to the prong is to form them so that the fingers are directed toward the fixed end of the prong or in any way that will cause entrapment of the prong with the weed root mass and the bight portions of the tool. The fingers 30 may be formed by spirals, grooves or burrs formed along the prong.

The weeder is provided with a leverage bar 32 mounted to the member between the handle 22 and the weed engaging end 14. The leverage bar 32 may be fixed to the member 12 at a fixed position or may be adjustably attached along the member. The leverage bar, 32 has a fixed end at 34 and includes a body portion 36 and a fulcrum corner 38 with the body portion 36 functioning to limit the entry of the weed engaging end of weeder into the ground an the fulcrum corner 38 functioning to provide a leverage action to assist in the removal of weeds from the ground as will be described hereinafter.

An alternative form of the weeder member 12 is illustrated in FIG. 4 where the body portion of the member 12 is curved at 40. The curved member is still framed with the bi-forked end to establish the tips 18 and the free end of the prong 24 is still positioned between the tips. This alternative form for the tool permits a slightly more vertical lifting force on the weed engaging end 12 of the tool.

FIG. 1 illustrates a weed 50 in phantom lines with the weed having surface foliage portions 52 and a subsurface root portion 54. As shown in this FIG, the weeder 10 is forced into the ground along the side of the weed 50 in a manner to align the root portion 54 of the weed 50 between the tips 18. The depth of penetration of the weeder 10 into the ground is limited by the engagement of the body portion 36 of the leverage bar 32 with the surface of the ground.

The member 12 penetrates the ground and, with the tool properly directed, the weed engaging end 14 of the member 12 is directed toward the weed root system 54 in a manner to direct the weed root into the V-shape between the tips 18 and the prong 24. As the tool is forced into the ground and toward the weed root 54 the pointed end of the serrated prong 24 either penetrates the weed root 54 or root mass establishing a firm grasp on the weed 50 or, as is more usual, the weed root 54 is forced into the area between the serrated prong 24 and one of the bights 20 formed by the serrated prong 24 extending between the bi-forked portion of the weed engaging end 14 of the weeder 10.

In cases where weeds have a mass of small roots at the root crown, the serrated prong 24 and the above noted bights 20 both form an engagement with the weed roots when the serrated prong becomes engaged or entangled with the weed root or root mass. When the weed roots are entangled with the tool, lowering the handle 22 about the fulcrum corner 38 of the leverage bar 32 will create an upward force on the weed engaging end 14 of the tool and the weed 50 with all or a large part of its root 54 will be extracted with very little disturbance to the surrounding ground and adjacent plants.

FIG. 3 illustrates in cross-section the entanglement of the weed root 54 by weed engaging end 14 of the tool with the prong 24 capturing the weed root between the prong and one or both of the tips 18. As shown in this and other figures the serrations 30 along the prong 24 entrap the weed roots and the entrapped roots are firmly held as the serrations grab against the body of the weed.

The usual manner of removing an entrapped weed is to use the leverage bar 32 to assist in the weed removal. By rotating the handle of the tool 10 toward the ground about the fulcrum corner 38 the member 12, the prong 24 and the weed root 54 are lifted out of the ground.

The weed engaging faces of the tips 18 are not intended to cut the weed root 54; their main function is to center the root in the weed engaging end 14 of the tool so a firm engagement may be made in one of the bights formed by the serrated prong 24 and one of the tips 18 and the weed may be lifted from the ground with all or most of the weed root intact. As has been said previously, cutting the weed root below the ground surface does not insure that the weed will be eliminated. It is best to remove as much as possible of the root with the surface foliage to perform an effective weed elimination.

The attachment of the prong 24 to the member 12 can be in any conventional manner. It is preferable to provide for an adjustable attachment so that the tip of the serrated prong extending beyond the bight 20 of the weed engaging end 14 can be adjusted. An adjustable connection will also permit the replacement of the prong should it become damaged or broken. A set screw locking attachment at the mounting 26 or a threaded interior of the mounting will permit the adjustment and/or replacement.

The serrations 30 along the prong 24 may be of many desirable forms, the importance is that they provide as positive an attachment to the root as possible. The serrations 30 may be a coarse screw thread (FIG. 1-8) or burrs (FIG. 9) along the length of the prong as is found in some metal nails.

The member 12 has a width across its face at the weed engaging end 14 that will make the tool effective in the removal of the weed root 54 with a minimum of the soil around the root. The width of the face may be between ½ inch to the size that will engage the largest weed to be encountered in the weeding operations as the function of the tool is to remove the weed and a minimum of divot, if any. The axial length of the flat portion of the member 12 may range from 7 or more inches to about 3 inches. Preferably the face of the member 12 at the weed engaging end 14 is flat while the handle engaging end 16 may be round or formed in a manner to provide for strength and ease of attachment to a handle as shown at 22.

The prong 24 is preferably aligned as a direct extension of the handle so as the tool is used it may be aimed so that the prong is directed toward the root zone of the weed to be removed. As shown in FIG. 6 the weed engaging end 14 of the tool may be formed with the prong 24 and the tips 18 as a single unit. The inner surfaces of the tips 18 facing the interior of the tips 18 will then be formed with the serrations 31. Forming both the inner surfaces of the tips 18 and the prong 24 with serrations is contemplated in the design of the present tool.

FIGS. 5-8 illustrate alternative forms for elements of the tool of the present invention. FIG. 5 illustrates a weed engaging portion with tips of unequal length; this form of the tool may be effective in directing the root portion of a weed into the bight of the tool. FIG. 6 illustrates two variations in the form of the tool; with the prong 24 formed as a part of the weed engaging portion 14 and with the interior portion of the tips 18 serrated at 31 and with the prong smooth. Another form could include serrations on both the tips and the prong. FIG 7 illustrates a weed engaging portion 14 of the tool with a single tip portion 18 and a prong 24; a bight is formed between the single tip and the serrated prong. FIG. 8 illustrates an alternative for the attachment of the tip portion 18 of the tool to the prong 24 and an alternative form for the leverage bar 36. In this form, the prong 24 is an extension of the handle engaging end 16 so as to be in alignment with the handle 22 and the depth control and leverage bar 36 with its fulcrum 38 is only attached near the weed engaging end of the tool. The leverage bar 36 may be provided with a threaded engagement at 37 with threaded serrations 30 on the prong 24 so that the leverage bar may adjustable along the tool to function as a depth control as well as a leverage bar. This FIG also shows an alternative for the weed engaging portion 14 wherein a threaded shoulder 15 cooperates with the threaded serrations 30 to permit adjustment of the relationship between the prong 24 and the tip end 18. FIG. 9 illustrates the formation of the serrations on the prong 24 as burrs 33. These burrs may be regularly or randomly placed along the prong 24.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:

1. A manually operable weeder tool for extracting weeds and at last a portion of their root systems from surrounding soil by engaging said tool with a weed in its root-crown zone and extracting the engaged weed, comprising:
   (a) a substantially planar member including a body portion having a weed engaging head, said head having a pair of separated tips wherein the adjacent sides of said pair of tips subtend an angle in the range of from about 5 degrees to about 140 degrees and at least one serrated prong extending between said tips and toward said weed-engaging head, and
   (b) an attached handle firmly connected to said body of said member and extending away from said weed-engaging head.

2. The tool of claim 1 wherein said serrations along said serrated portion are angled to permit ease of entry of said prong into said root-crown zone of said weed but to resist withdrawal of said prong from said root-crown zone as said tool extracts said weed from surrounding soil.

3. The tool of claim 1 wherein said serrations along said serrated prong are screw-thread like.

4. A manually operable weeder tool for extracting weeds and at least a portion of their root systems from surrounding soil by engaging said tool with a weed in its root-crown zone in said soil and extracting the engaged weed from said soil, comprising:
   (a) a substantially planar member including a body portion having a weed engaging head, said head having a pair of separated tips formed in V-shape wherein the adjacent sides of said V-shape subtend an angle in the range of from about 5 degrees to about 140 degrees, said separated tips adapted to engage said root-crown zone of said weed within said soil, and at least one linearly extending stationary prong, said prong having a generally pointed portion extending parallel to said head in alignment with said V-shape between said adjacent sides and adapted to engage and entrap said root-crown zone of said weed within said V-shape in said soil, and
   (b) an attached handle firmly connected to said body of said member and extending away from said weed-engaging head, said handle adapted for moving said planar member within said soil whereby said weed and said root system may be removed from said soil with said root system entrapped by said prong within said V-shape.

5. The tool of claim 1 or 4 having a depth control attachment afixed between said body portion of said weed engaging head and said handle engaging end of said member in a plane substantially perpendicular to the plane of said member, said depth control attachment functioning to limit the entry of said weeder tool into said surrounding soil.

6. The tool of claim 1 or 4 with the addition of a leverage bar having an attachment end fixed to said tool adjacent to said handle and a leverage end fixed to said tool near said planar member.

7. The tool of claim 1 or 4 wherein said prong is aligned as an extension of said handle connected to said member.

8. The tool of claim 1 or 4 having a depth control attachment located in the range of from between attached to said head and 7 inches from said tips of said member and in a plane substantially perpendicular to the plane of said member, said attachment providing fulcrum support when said handle is manually lowered earthward for extracting said weed from the surrounding soil.

* * * * *